US010118129B2

(12) United States Patent
Eda et al.

(10) Patent No.: US 10,118,129 B2
(45) Date of Patent: Nov. 6, 2018

(54) NATURAL-GAS PURIFICATION APPARATUS

(71) Applicant: MITSUBISHI HEAVY INDUSTRIES, LTD., Tokyo (JP)

(72) Inventors: Masayuki Eda, Houston, TX (US); Wataru Matsubara, Tokyo (JP); Shintaro Honjo, Tokyo (JP); Susumu Okino, Tokyo (JP); Hiromi Nakatani, Tokyo (JP); Masaki Yushima, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/475,974

(22) Filed: Mar. 31, 2017

(65) Prior Publication Data

US 2018/0280883 A1 Oct. 4, 2018

(51) Int. Cl.
*B01D 53/22* (2006.01)
*B01D 63/00* (2006.01)
(Continued)

(52) U.S. Cl.
CPC ........... *B01D 63/00* (2013.01); *B01D 53/002* (2013.01); *B01D 53/229* (2013.01); *B01D 53/30* (2013.01);
(Continued)

(58) Field of Classification Search
CPC .... B01D 53/30; B01D 63/00; B01D 2313/22; B01D 53/002; B01D 53/229; B01D 2313/243; B01D 2313/10; B01D 2053/221; C10L 2290/58; C10L 2290/06; C10L 2290/542; C10L 3/104; F25J 2215/66;
(Continued)

(56) References Cited

U.S. PATENT DOCUMENTS

| 5,709,733 A * | 1/1998 | Hachisuka ........... B01D 53/228 95/45 |
| 9,599,070 B2 * | 3/2017 | Huntington ............. F02C 3/107 |

(Continued)

FOREIGN PATENT DOCUMENTS

| JP | 2009-113994 A | 5/2009 |
| JP | 2016-155987 A | 9/2016 |

*Primary Examiner* — Anthony R Shumate
(74) *Attorney, Agent, or Firm* — Westerman, Hattori, Daniels & Adrian, LLP

(57) ABSTRACT

A natural-gas purification apparatus includes: a compressor; a cooling unit that liquefies and separates a part of natural-gas liquid; a heating unit; first to third carbon-dioxide separation units that separate carbon dioxide through carbon-dioxide separation membranes; a detection carbon-dioxide separation unit that further separates carbon dioxide through a carbon-dioxide separation membrane; a carbon-dioxide-flow-rate sensor that detects the amount of carbon dioxide separated by the detection carbon-dioxide separation unit; an arithmetic control device that adjusts and controls at least one of the pressure to be applied by the compressor, the cooling temperature of the cooling unit, and the heating temperature of the heat unit based on information from the carbon-dioxide-flow-rate sensor such that the amount of carbon dioxide to be separated by the detection carbon-dioxide separation unit will be higher than or equal to a prescribed amount.

10 Claims, 4 Drawing Sheets

(51) Int. Cl.
- *B01D 53/00* (2006.01)
- *B01D 53/30* (2006.01)
- *C10L 3/10* (2006.01)
- *F25J 3/08* (2006.01)

(52) U.S. Cl.
CPC ............ *C10L 3/104* (2013.01); *F25J 3/08* (2013.01); *B01D 2053/221* (2013.01); *B01D 2313/10* (2013.01); *B01D 2313/22* (2013.01); *B01D 2313/243* (2013.01); *C10L 2290/06* (2013.01); *C10L 2290/542* (2013.01); *C10L 2290/58* (2013.01); *F25J 2205/02* (2013.01); *F25J 2205/80* (2013.01); *F25J 2210/60* (2013.01); *F25J 2210/80* (2013.01); *F25J 2215/04* (2013.01); *F25J 2215/64* (2013.01); *F25J 2215/66* (2013.01); *F25J 2220/66* (2013.01); *F25J 2230/30* (2013.01); *F25J 2230/60* (2013.01); *F25J 2280/50* (2013.01)

(58) Field of Classification Search
CPC .. F25J 2205/02; F25J 2205/80; F25J 2220/66; F25J 2215/64; F25J 3/08; F25J 2210/60; F25J 2230/30; F25J 2215/04; F25J 2210/80; F25J 2280/50; F25J 2230/60

See application file for complete search history.

(56) References Cited

U.S. PATENT DOCUMENTS

| | | | | |
|---|---|---|---|---|
| 9,752,458 | B2* | 9/2017 | Huntington | F01D 25/30 |
| 9,885,290 | B2* | 2/2018 | Della-Fera | F02C 9/16 |
| 9,915,200 | B2* | 3/2018 | Minto | F02C 3/34 |
| 9,951,658 | B2* | 4/2018 | Vaezi | F01K 23/101 |
| 2003/0173072 | A1* | 9/2003 | Vinegar | B09C 1/02 |
| | | | | 166/66.5 |
| 2003/0173085 | A1* | 9/2003 | Vinegar | E21B 43/006 |
| | | | | 166/302 |
| 2003/0192693 | A1* | 10/2003 | Wellington | E21B 41/0064 |
| | | | | 166/267 |
| 2004/0020642 | A1* | 2/2004 | Vinegar | B09C 1/02 |
| | | | | 166/245 |
| 2010/0047866 | A1* | 2/2010 | Borchert | B01D 53/84 |
| | | | | 435/69.1 |
| 2013/0074757 | A1* | 3/2013 | McAlister | B01J 7/00 |
| | | | | 114/264 |

* cited by examiner

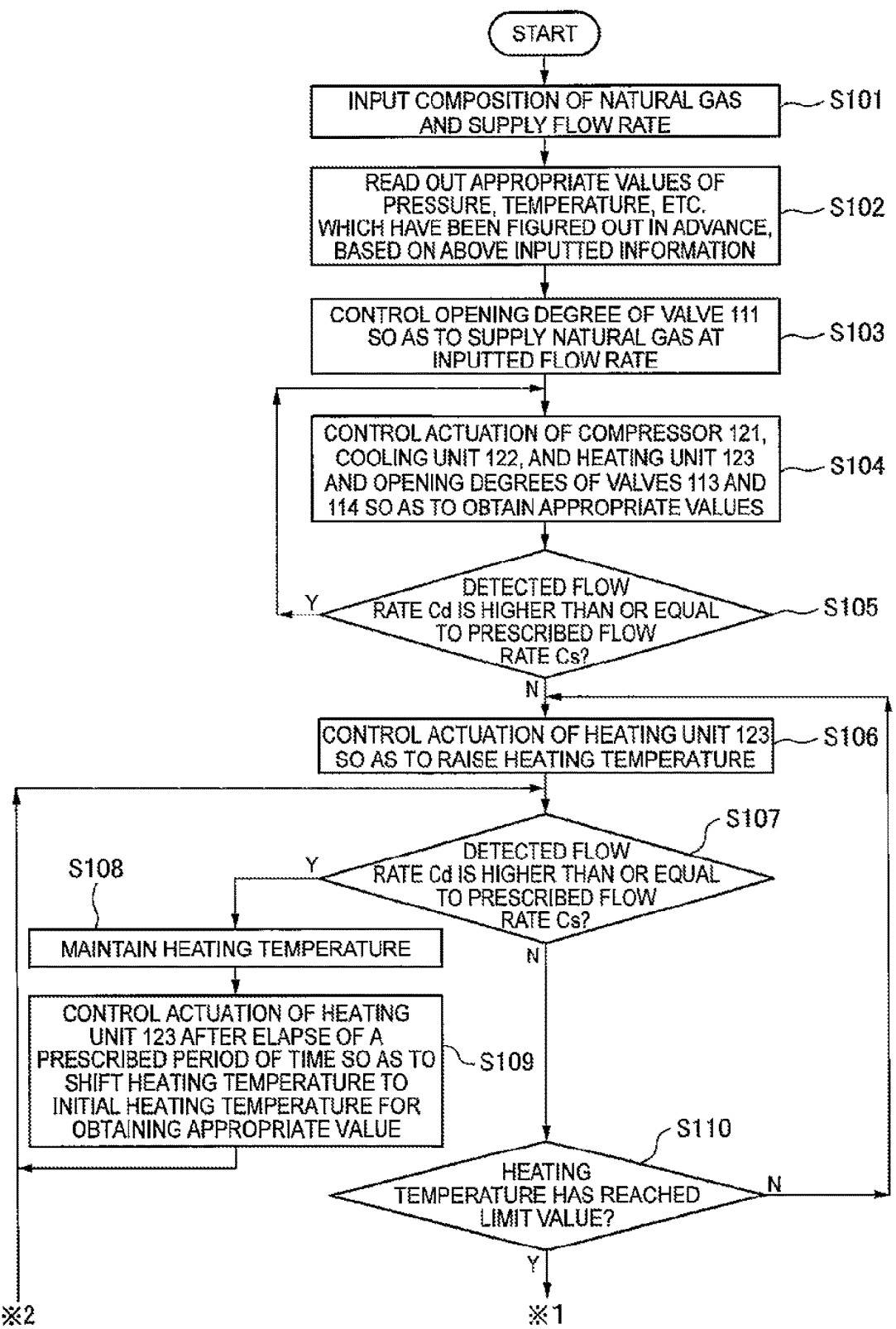

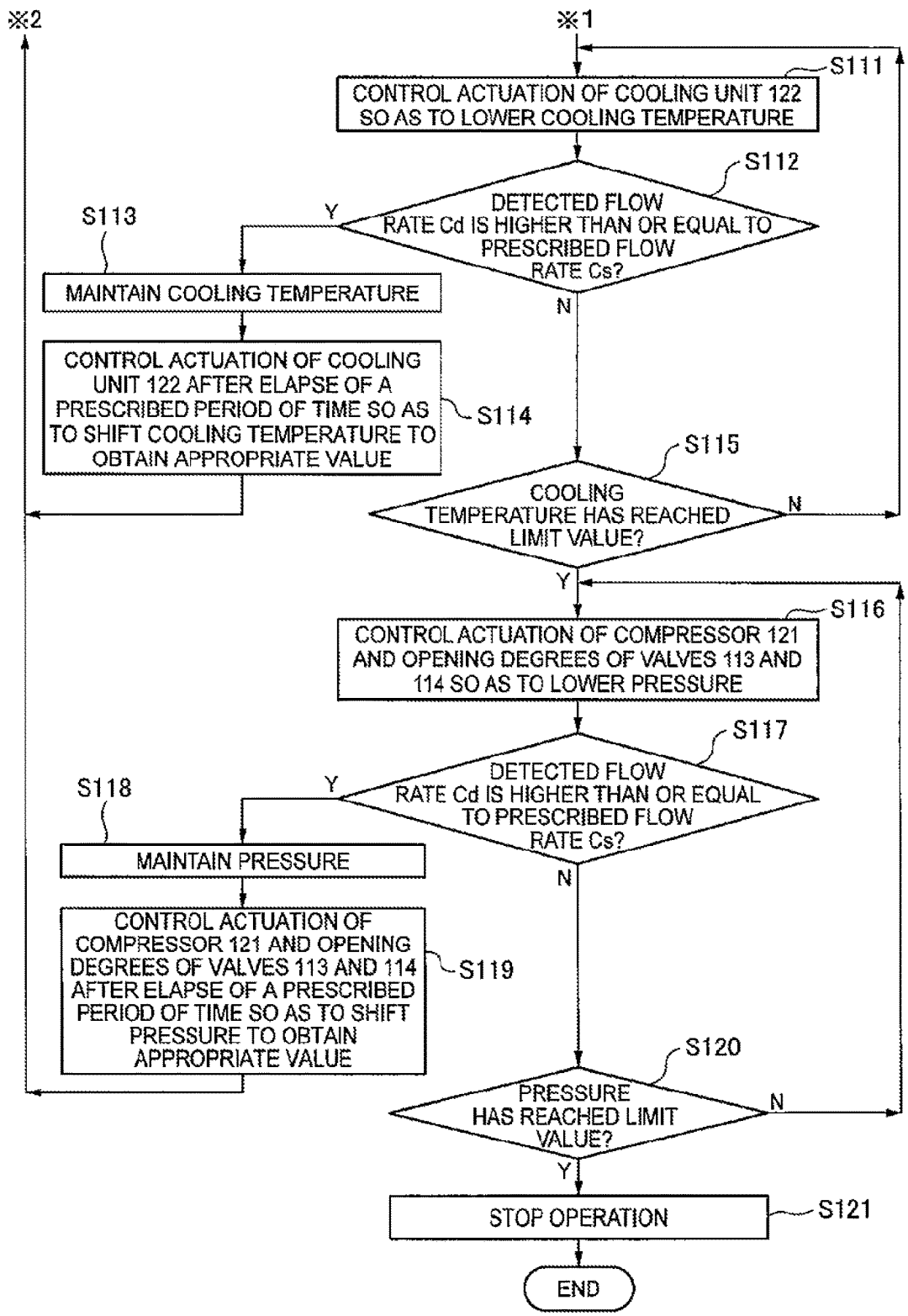

NATURAL-GAS PURIFICATION APPARATUS

TECHNICAL FIELD

The present invention relates to a natural-gas purification apparatus for purifying natural gas from the ground by separating carbon dioxide from the natural gas.

BACKGROUND ART

Natural gases discharged to the surface of the ground from high-temperature high-pressure underground areas such as oil and gas fields include: dry gases with one to two carbon atoms such as methane ($CH_4$) and ethane ($C_2H_6$), which are in gaseous form even at normal temperature and pressure; natural-gas liquids containing components with three to four carbon atoms such as propane ($C_3H_8$) and butane ($C_4H_{10}$), which are in gaseous form at normal temperature and pressure but are easily liquefied when pressurized or cooled, and components with five or more carbon atoms such as pentane ($C_5H_{12}$), which is in liquid form at normal temperature and pressure; and non-hydrocarbon gases such as carbon dioxide ($CO_2$).

Such a natural gas is pressurized (to 0.5 to 2 MPa) by a compressor and cooled (to 0 to 20° C.) by a cooling unit to undergo gas-liquid separation in which a part of its natural-gas liquid is liquefied. The natural gas is then raised in temperature by being heated (to 50 to 80° C.) by a heating unit. Thereafter, the carbon dioxide is passed through a carbon-dioxide separation membrane to a lower pressure side, so that the carbon dioxide is separated and removed. As a result, the natural gas is purified.

CITATION LIST

Patent Literatures

{Patent Literature 1} Japanese Patent Application Publication No. 2016-155987
{Patent Literature 2} Japanese Patent Application Publication No. 2009-113994

SUMMARY OF INVENTION

Technical Problem

In the case where the carbon dioxide is separated and removed as mentioned above, the carbon dioxide expands and therefore drops in temperature when passed through the carbon-dioxide separation membrane to the lower pressure side. Consequently, the carbon dioxide cools the carbon-dioxide separation membrane. As the carbon dioxide thus cools the carbon-dioxide separation membrane and lowers its temperature, a part of the remaining natural-gas liquid is liquefied on the higher pressure side and covers the carbon-dioxide separation membrane. This might cause functional deterioration of the carbon-dioxide separation membrane.

Thus, in a conventional practice, the natural gas is cooled by the cooling unit to as low a temperature as possible (approximately 0° C.) to undergo gas-liquid separation in which a part of its natural-gas liquid is liquefied as much as possible, and then heated by the heating unit to as high a temperature as possible (approximately 80° C.) to maximize the difference from the dew point (liquefaction temperature). In this way, the generation of a liquid film on the higher pressure side is suppressed, and therefore the functional deterioration of the carbon-dioxide separation membrane is prevented.

Then, energy is wastefully consumed in cases where a liquid film is unlikely to be generated in the first place (such as cases where the amounts of the carbon dioxide component and the natural-gas liquid component in the natural gas are small).

In view of the above, an object of the present invention is to provide a natural-gas purification apparatus capable of greatly reducing wasteful energy consumption.

Solution to Problem

To achieve the above-described object, a natural-gas purification apparatus according to the present invention provides a natural-gas purification apparatus for purifying natural gas from ground by separating carbon dioxide from the natural gas, including: a pressure adjuster that adjusts a pressure of the natural gas from the ground; a natural-gas-liquid separator that liquefies and separates a part of natural-gas liquid by cooling the natural gas after the pressure adjustment by the pressure adjuster; a heater that heats the natural gas after the separation of the part of the natural-gas liquid by the natural-gas-liquid separator; a carbon-dioxide separator that separates carbon dioxide from the natural gas heated by the heater through a carbon-dioxide separation membrane; a detection carbon-dioxide separator that further separates carbon dioxide from purified gas obtained as a result of the carbon-dioxide separation by the carbon-dioxide separator through a carbon-dioxide separation membrane; a carbon-dioxide-amount detector that detects an amount of carbon dioxide separated by the detection carbon-dioxide separator; and a controller that adjusts and controls at least one of a pressure of the natural gas to be achieved by the pressure adjuster, a temperature to which the natural gas is to be cooled by the natural-gas-liquid separator, and a temperature to which the natural gas is to be heated by the heater based on information from the carbon-dioxide-amount detector such that the amount of carbon dioxide to be separated by the detection carbon-dioxide separator is higher than or equal to a prescribed amount.

Moreover, in the natural-gas purification apparatus according to the above-described present invention, the controller preferably controls actuation of the heater so as to raise a heating temperature of the heater if a detected amount Cd detected by the carbon-dioxide-amount detector is lower than a prescribed amount Cs which has been determined and inputted in advance (Cd<Cs).

Moreover, in the natural-gas purification apparatus according to the above-described present invention, the controller preferably controls the actuation of the heater so as to shift the heating temperature of the heater to an initial heating temperature if the detected amount Cd reaches or exceeds the prescribed amount Cs (Cd≥Cs).

Moreover, in the natural-gas purification apparatus according to the above-described present invention, the controller preferably controller controls actuation of the natural-gas-liquid separator so as to lower a cooling temperature of the natural-gas-liquid separator if the heating temperature of the heater reaches a limit value without the detected amount Cd reaching or exceeding the prescribed amount Cs.

Moreover, in the natural-gas purification apparatus according to the above-described present invention, the controller preferably controls the actuation of the natural-gas-liquid separator so as to shift the cooling temperature of the natural-gas-liquid separator to an initial cooling temperature if the detected amount Cd reaches or exceeds the prescribed amount Cs (Cd≥Cs).

Moreover, in the natural-gas purification apparatus according to the above-described present invention, the controller preferably controls actuation of the pressure adjuster so as to lower a pressure to be applied by the pressure adjuster if the cooling temperature of the natural-gas-liquid separator reaches a limit value without the detected amount Cd reaching or exceeding the prescribed amount Cs.

Moreover, in the natural-gas purification apparatus according to the above-described present invention, the controller preferably controls the actuation of the pressure adjuster so as to shift the pressure to be applied by the pressure adjuster to an initial pressure if the detected amount Cd reaches or exceeds the prescribed amount Cs (Cd≥Cs).

Moreover, in the natural-gas purification apparatus according to the above-described present invention, the natural-gas purification apparatus preferably includes a plurality of the detection carbon-dioxide separators and a plurality of the carbon-dioxide-amount detectors, the natural-gas purification apparatus preferably further includes a flow-path switcher that switches a flow path of purified gas from the carbon-dioxide separator such that the purified gas from the carbon-dioxide separator is supplied to one of the plurality of detection carbon-dioxide separators, and if the amount of carbon dioxide separated by one of the detection carbon-dioxide separators to which the purified gas from the carbon-dioxide separator is being supplied falls below a prescribed amount, the controller preferably controls switching of the flow-path switcher based on information from the corresponding one of the carbon-dioxide-amount detectors so as to supply the purified gas from the carbon-dioxide separator to another one of the detection carbon-dioxide separators.

Moreover, in the natural-gas purification apparatus according to the above-described present invention, the natural-gas purification apparatus preferably further includes a restoration heater capable of heating each of the carbon-dioxide separation membranes of the plurality of detection carbon-dioxide separators, in which when controlling the switching of the flow-path switcher so as to supply the purified gas from the carbon-dioxide separator to the other one of the detection carbon-dioxide separators, the controller simultaneously controls actuation of the restoration heater so as to heat the carbon-dioxide separation membrane of the one of the detection carbon-dioxide separators with which the amount of carbon dioxide separated has fallen below the prescribed amount.

Moreover, in the natural-gas purification apparatus according to the above-described present invention, when controlling the switching of the flow-path switcher so as to supply the purified gas from the carbon-dioxide separator to the one of the detection carbon-dioxide separators whose carbon-dioxide separation membrane is being heated by the restoration heater, the controller preferably simultaneously controls the actuation of the restoration heater so as to stop the heating of the carbon-dioxide separation membrane of the one of the detection carbon-dioxide separators.

Advantageous Effect of Invention

In the natural-gas purification apparatus according to the present invention, the natural gas does not need to always be cooled by the natural-gas-liquid separator to as low a temperature as possible to undergo gas-liquid separation in which a part of the natural-gas liquid is liquefied as much as possible, and then heated by the heater to as high a temperature as possible to maximize the difference from the dew point (liquefaction temperature), as in the conventional practice. Hence, it is possible to prevent wasteful energy consumption while always preventing the generation of a liquid film over the carbon-dioxide separation membrane of the carbon-dioxide separator.

BRIEF DESCRIPTION OF DRAWINGS

FIG. 2A illustrates a flowchart of main control performed in the natural-gas purification apparatus in FIG. 1;

FIG. 2B illustrates a flowchart of the main control continuing from FIG. 2A.

DESCRIPTION OF EMBODIMENTS

Embodiments of a natural-gas purification apparatus according to the present invention will be described with reference to the drawings. It is to be noted that the present invention is not limited only to the following embodiments to be described with reference to the drawings.

First Embodiment

A first embodiment of the natural-gas purification apparatus according to the present invention will be described with reference to FIGS. 1, 2A, and 2B.

Figure 1:
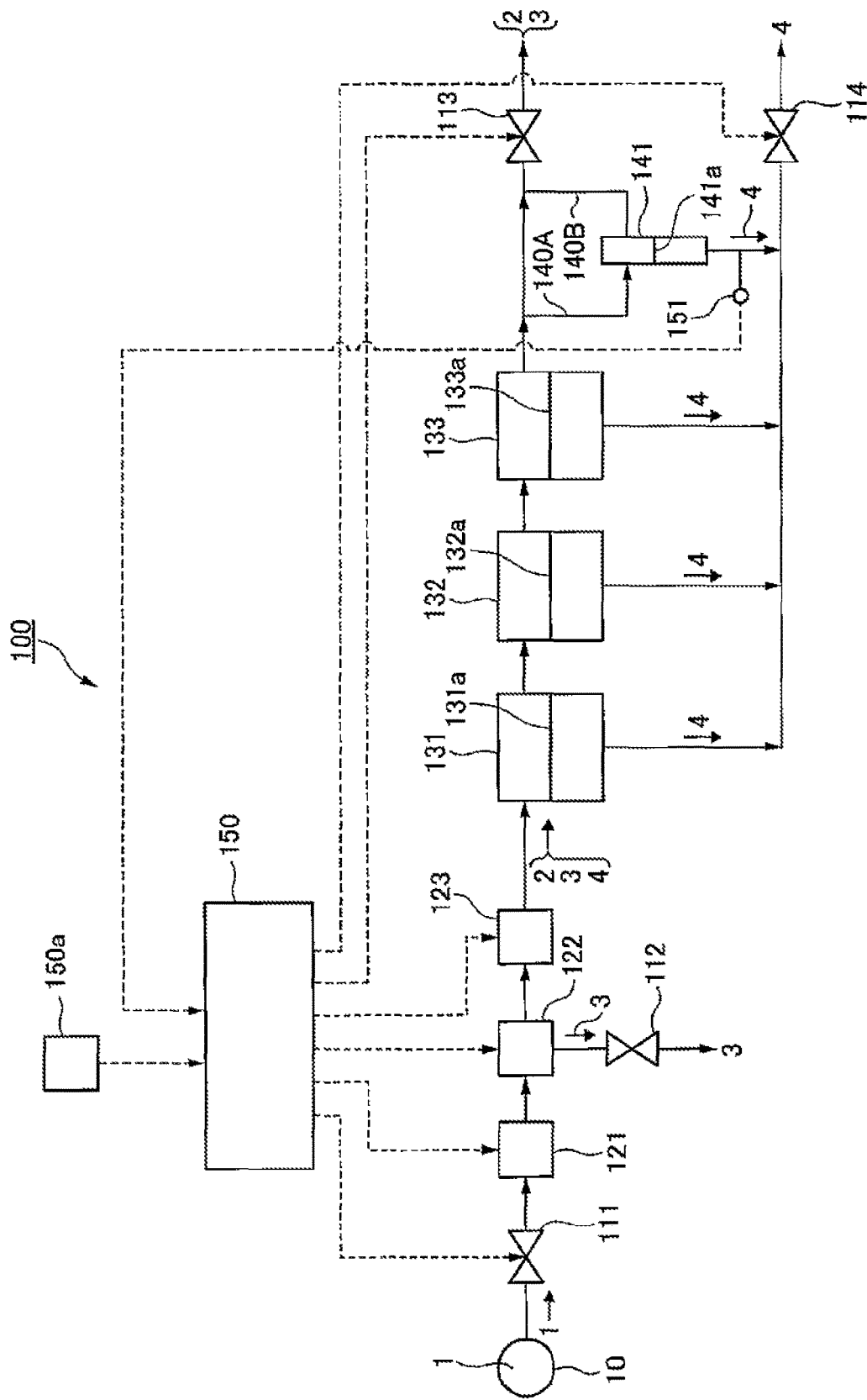
FIG. 1 illustrates a schematic configuration diagram of a first embodiment of a natural-gas purification apparatus according to the present invention.

As illustrated in FIG. 1, a natural-gas source 10 that discharges natural gas 1 from the ground is connected to an inlet port of a compressor 121 through a valve 111. An outlet port of the compressor 121 is connected to an inlet port of a cooling unit 122. A liquid outlet port of the cooling unit 122 communicates with the outside of the system through a valve 112. A gas outlet port of the cooling unit 122 is connected to an inlet port of a heating unit 123. An outlet port of the heating unit 123 is connected to a gas inlet port of a first carbon-dioxide separation unit 131 including a carbon-dioxide separation membrane 131a that separates carbon dioxide ($CO_2$) from gas.

A post-separation-gas outlet port of the first carbon-dioxide separation unit 131 is connected to a gas inlet port of a second carbon-dioxide separation unit 132 including a carbon-dioxide separation membrane 132a. A post-separation-gas outlet port of the second carbon-dioxide separation unit 132 is connected to a gas inlet port of a third carbon-dioxide separation unit 133 including a carbon-dioxide separation membrane 133a. A post-separation-gas outlet port of the third carbon-dioxide separation unit 133 is connected to the outside of the system through a valve 113.

One end side of a sampling line 140A is connected between the post-separation-gas outlet port of the third carbon-dioxide separation unit 133 and the valve 113. The other end side of the sampling line 140A is connected to a gas inlet port of a detection carbon-dioxide separation unit 141 which is a detection carbon-dioxide separator including a carbon-dioxide separation membrane 141a. One end side of a sampling line 140B is connected to a post-separation-gas outlet port of the detection carbon-dioxide separation unit 141. The other end side of the sampling line 140B is connected between the sampling line 140A and the valve 113. The carbon-dioxide outlet ports of the first to third carbon-dioxide separation units 131 to 133 and the detection carbon-dioxide separation unit 141 are connected to the outside of the system through the valve 114.

Here, the sampling lines 140A and 140B are smaller in radial size than the main line between the third carbon-dioxide separation unit 133 and the valve 113 and is smaller in flow volume than the main line.

Also, the carbon-dioxide separation membrane 141a of the detection carbon-dioxide separation unit 141 is significantly smaller in surface area than the carbon-dioxide separation membranes 131a to 133a of the first to third carbon-dioxide separation units 131 to 133 (approximately 5% or smaller).

Near the carbon-dioxide outlet port of the detection carbon-dioxide separation unit 141, a carbon-dioxide-flow-rate sensor 151 is provided which is a carbon-dioxide-amount detector that detects the flow rate of carbon dioxide separated by and discharged from the detection carbon-dioxide separation unit 141. The carbon-dioxide-flow-rate sensor 151 is electrically connected to an input of an arithmetic control device 150 which is a controller. An input unit 150a which is an input device that inputs information such as the composition and the supply flow rate of the natural gas 1, is electrically connected to the input of the arithmetic control device 150.

An output of the arithmetic control device 150 is electrically connected to the valves 111, 113, and 114 and electrically connected to the compressor 121, the cooling unit 122, and the heating unit 123. The arithmetic control device 150 can control the opening degrees of the valves 111, 113, and 114 and control the actuation of the compressor 121, the cooling unit 122, and the heating unit 123 based on the above-mentioned information inputted from the input unit 150a and information from the carbon-dioxide-flow-rate sensor 151 (details will be described later).

Note that, in this embodiment, components such as the valve 111 constitute a gas-flow-rate adjuster, components such as the valves 113 and 114 and the compressor 121 constitute a pressure adjuster, components such as the cooling unit 122 constitute a natural-gas-liquid separator, components such as the heating unit 123 constitute a heater, and components such as the first to third carbon-dioxide separation units 131 to 133 constitute a carbon-dioxide separator.

Next, a natural-gas purification method using a natural-gas purification apparatus 100 according to this embodiment as mentioned above will be described.

First, the composition of the natural gas 1 from the natural-gas source 10 (the proportions of dry gas 2, natural-gas liquid 3, carbon dioxide 4, and the like) is figured out in advance using analysis equipment such as a gas chromatograph (GC), and this composition of the natural gas 1 and a supply flow rate are inputted into the input unit 150a (S101 in FIG. 2A). Then, based on the above information from the input unit 150a, the arithmetic control device 150 reads out an appropriate value of pressure for purifying the natural gas 1 from the ground, an appropriate value of temperature for liquefying a part of the natural-gas liquid 3, and an appropriate value of temperature for maintaining the remaining part of the natural-gas liquid 3 in gaseous form (preventing liquefaction) for the composition of the natural gas 1 (S102 in FIG. 2A). These appropriate values have been figured out, inputted, and set in advance.

Thereafter, the arithmetic control device 150 adjusts and controls the opening degree of the valve 111 so as to supply the natural gas 1 at the inputted flow rate (S103 in FIG. 2A).

Also, the arithmetic control device 150 adjusts and controls the actuation of the compressor 121, the cooling unit 122, and the heating unit 123 and the opening degrees of the valves 113 and 114 so as to obtain the appropriate values (S104 in FIG. 2A).

Thus, the natural gas 1 is pressurized (to 0.5 to 2 MPa) by the compressor 121 and then cooled (to 0 to 20° C.) by the cooling unit 122, so that a part of the natural-gas liquid 3 is liquefied and discharged to the outside of the system through the valve 112. On the other hand, the remaining gas (the dry gas 2, the remaining part of natural-gas liquid 3, and the carbon dioxide 4) is heated (to 50 to 80° C.) by the heating unit 123 and then supplied to the carbon-dioxide separation units 131 to 133.

When the natural gas 1 is supplied to the carbon-dioxide separation units 131 to 133, the carbon dioxide 4 is moved through the carbon-dioxide separation membranes 131a to 133a to the lower pressure side (the carbon-dioxide flow side) and is discharged from the carbon-dioxide outlet ports. On the other hand, the remaining gas (the dry gas 2 and the remaining part of the natural-gas liquid 3) is discharged from the post-separation-gas outlet ports without being liquefied.

A part of the remaining gas discharged from the post-separation-gas outlet port of the third carbon-dioxide separation unit 133 (purified gas) is sampled into the sampling line 140A and supplied to the detection carbon-dioxide separation unit 141.

When the sampled gas is supplied to the detection carbon-dioxide separation unit 141, the small amount of carbon dioxide 4 present in the gas is moved through the carbon-dioxide separation membrane 141a to the lower pressure side (carbon-dioxide flow side), thereby being separated, and is discharged from the carbon-dioxide outlet port. On the other hand, the remaining gas (the dry gas 2 and the remaining part of the natural-gas liquid 3) is discharged from the post-separation-gas outlet port.

The carbon dioxide 4 discharged from the carbon-dioxide outlet port of the detection carbon-dioxide separation unit 141 is discharged to the outside of the system through the valve 114 together with the carbon dioxide 4 discharged from the carbon-dioxide outlet ports of the first to third carbon-dioxide separation units 131 to 133.

Also, the remaining gas discharged from the post-separation-gas outlet port of the detection carbon-dioxide separation unit 141 (the dry gas 2 and the remaining part of the natural-gas liquid 3) is returned to the main line through the sampling line 140B and discharged to the outside of the system through the valve 113 together with the remaining gas discharged from the post-separation-gas outlet ports of the first to third carbon-dioxide separation units 131 to 133 (purified gas).

While the natural gas 1 is purified as above, the arithmetic control device 150 determines whether or not a detected flow rate Cd which is a detected amount detected by the carbon-dioxide-flow-rate sensor 151 is higher than or equal to a prescribed flow rate Cs which is a prescribed amount determined and inputted in advance (Cd≥Cs) (S105 in FIG. 2A).

Specifically, due to some reason, the inside of the third carbon-dioxide separation unit 133, which is situated at the most downstream side in the direction of the gas flow and most prone to liquefaction, might come close to a condition where liquefaction is likely to occur. In such a case, before liquefaction occurs in the third carbon-dioxide separation unit 133, liquefaction occurs in the detection carbon-dioxide separation unit 141, so that a liquid film covers the carbon-dioxide separation membrane 141a, which has a significantly smaller surface area. Consequently, the amount of carbon dioxide passing through the carbon-dioxide separation membrane 141a decreases drastically, and the detected flow rate Cd, which is detected by the carbon-dioxide-flow-rate sensor 151, decreases as well.

Then, if the detected flow rate Cd is higher than or equal to the prescribed flow rate Cs (Cd≥Cs), the arithmetic control device 150 determines based on the information from the carbon-dioxide-flow-rate sensor 151 that the operation is being carried out properly, and returns to step S104 to maintain that state.

On the other hand, if the detected flow rate Cd is lower than the prescribed flow rate Cs (Cd<Cs), the arithmetic control device 150 controls the actuation of the heating unit 123 based on the information from the carbon-dioxide-flow-rate sensor 151 so as to raise the heating temperature of the heating unit 123 (S106 in FIG. 2A).

While raising the heating temperature of the heating unit 123 as above, the arithmetic control device 150 determines whether or not the detected flow rate Cd, which is detected by the carbon-dioxide-flow-rate sensor 151, reaches or exceeds the prescribed flow rate Cs, which has been determined and inputted in advance (Cd≥Cs) (S107 in FIG. 2A).

Specifically, as the heating temperature of the heating unit 123 is raised and the inside of the third carbon-dioxide separation unit 133 reaches a condition where liquefaction will not occur, the liquid film covering the carbon-dioxide separation membrane 141a of the detection carbon-dioxide separation unit 141 vaporizes and disappears. Thus, the amount of carbon dioxide passing through the carbon-dioxide separation membrane 141a is restored to the initial amount, and the detected flow rate Cd, which is detected by the carbon-dioxide-flow-rate sensor 151, reaches or exceeds the prescribed flow rate Cs (Cd≥Cs).

Then, if the detected flow rate Cd reaches or exceeds the prescribed flow rate Cs (Cd≥Cs), the arithmetic control device 150 maintains that heating temperature for a while based on the information from the carbon-dioxide-flow-rate sensor 151 (S108 in FIG. 2A). After the elapse of a prescribed period of time, the arithmetic control device 150 controls the actuation of the heating unit 123 so as to shift the heating temperature to the initial heating temperature for obtaining the appropriate value (S109 in FIG. 2A). Meanwhile, the arithmetic control device 150 returns to step S107 and determines again based on the information from the carbon-dioxide-flow-rate sensor 151 whether or not the detected flow rate Cd is higher than or equal to the prescribed flow rate Cs.

Specifically, if whatever condition where liquefaction is likely to occur is solved by raising the temperature and the operation is continued in that state, energy will be wasted. If the detected flow rate Cd is higher than or equal to the prescribed flow rate Cs (Cd≥Cs), the arithmetic control device 150 determines that the operation has been restored to the initial, most appropriate condition, and iterates steps S107 to S109.

On the other hand, there is a case where the heating temperature of the heating unit 123 is raised but the detected flow rate Cd does not reach or exceed the prescribed flow rate Cs and the heating temperature of the heating unit 123 reaches its limit value (e.g. the withstand temperature of the carbon-dioxide separation membrane (approximately 80 C)) (S110 in FIG. 2A). In this case, the arithmetic control device 150 determines that the liquefaction cannot be solved by heating, and controls the actuation of the cooling unit 122 so as to lower the cooling temperature of the cooling unit 122 (S111 in FIG. 2B).

While lowering the cooling temperature of the cooling unit 122 as above, the arithmetic control device 150 determines whether or not the detected flow rate Cd, which is detected by the carbon-dioxide-flow-rate sensor 151, reaches or exceeds the prescribed flow rate Cs (Cd≥Cs) (S112 in FIG. 2B).

Then, if the detected flow rate Cd reaches or exceeds the prescribed flow rate Cs (Cd≥Cs), the arithmetic control device 150 maintains that cooling temperature for a while based on the information from the carbon-dioxide-flow-rate sensor 151 (S113 in FIG. 2B). After the elapse of a prescribed period of time, the arithmetic control device 150 controls the actuation of the cooling unit 122 so as to shift the cooling temperature to the initial cooling temperature for obtaining the appropriate value (S114 in FIG. 2B). Meanwhile, the arithmetic control device 150 returns to step S107 and determines again based on the information from the carbon-dioxide-flow-rate sensor 151 whether or not the detected flow rate Cd is higher than or equal to the prescribed flow rate Cs. If the detected flow rate Cd is higher than or equal to the prescribed flow rate Cs (Cd≥Cs), the arithmetic control device 150 iterates steps S107 to S114.

On the other hand, there is a case where the cooling temperature of the cooling unit 122 is lowered but the detected flow rate Cd does not reach or exceed the prescribed flow rate Cs and the cooling temperature of the cooling unit 122 reaches its limit value (e.g. 0 C) (S115 in FIG. 2B). In this case, the arithmetic control device 150 determines that the liquefaction cannot be solved by cooling, and controls the actuation of the compressor 121 and the opening degrees of the valves 113 and 114 so as to lower the pressure to be applied by the compressor 121 and the valves 113 and 114 (S116 in FIG. 2B).

While the pressure to be applied by the compressor 121 and the valves 113 and 114 is lowered as above, the arithmetic control device 150 determines whether or not the detected flow rate Cd, which is detected by the carbon-dioxide-flow-rate sensor 151, reaches or exceeds the prescribed flow rate Cs (Cd≥Cs) (S117 in FIG. 2B).

Then, if the detected flow rate Cd reaches or exceeds the prescribed flow rate Cs (Cd≥Cs), the arithmetic control device 150 maintains that pressure for a while based on the information from the carbon-dioxide-flow-rate sensor 151 (S118 in FIG. 2B). After the elapse of a prescribed period of time, the arithmetic control device 150 controls the actuation of the compressor 121 and the opening degrees of the valves 113 and 114 so as to shift the pressure to the initial pressure for obtaining the appropriate value (S119 in FIG. 2B). Meanwhile, the arithmetic control device 150 returns to step S107 and determines again based on the information from the carbon-dioxide-flow-rate sensor 151 whether or not the detected flow rate Cd is higher than or equal to the prescribed flow rate Cs. If the detected flow rate Cd is higher than or equal to the prescribed flow rate Cs (Cd≥Cs), the arithmetic control device 150 iterates steps S107 to S119.

On the other hand, there is a case where the pressure to be applied by the compressor 121 and the valves 113 and 114 is lowered but the detected flow rate Cd does not reach or exceed the prescribed flow rate Cs and the pressure that can maintained by the compressor 121 and the valves 113 and 114 reaches its limit value (e.g. 0.5 MPa) (S120 in FIG. 2B). In this case, the arithmetic control device 150 determines based on the information from the carbon-dioxide-flow-rate sensor 151 that the composition of the natural gas 1 from the natural-gas source 10 (the proportions of the dry gas 2, the natural-gas liquid 3, the carbon dioxide 4, and the like), the appropriate values which have been figured out, inputted, and set in advance, and so on are not correct, and stops the operation (S121 in FIG. 2B).

In sum, in this embodiment, the detection carbon-dioxide separation unit 141 with the carbon-dioxide separation membrane 141a, which is significantly smaller in surface area than the carbon-dioxide separation membranes 131a to 133a of the first to third carbon-dioxide separation units 131 to 133, is arranged downstream of the carbon-dioxide separation units 131 to 133 in the direction of flow of the purified gas with the sampling lines 140A and 140B therebetween. Further, the compressor 121, the cooling unit 122, and the heating unit 123 are adjusted and controlled such that the detected flow rate Cd, detected by the carbon-dioxide-flow-rate sensor 151, of the carbon dioxide 4 to be separated by the carbon-dioxide separation membrane 141a of the detection carbon-dioxide separation unit 141 will be higher than or equal to the prescribed flow rate Cs.

Thus, in this embodiment, it is possible to detect in advance that a liquid film is about to cover the carbon-dioxide separation membranes 131a to 133a of the carbon-dioxide separation units 131 to 133, and therefore operate the natural-gas purification apparatus 100 in a condition where the generation of a liquid film over the carbon-dioxide separation membranes 131a to 133a of the carbon-dioxide separation units 131 to 133 is prevented and the waste of energy is small.

Hence, according to this embodiment, the natural gas 1 does not need to always be cooled by the cooling unit 122 to as low a temperature as possible (approximately 0° C.) to undergo gas-liquid separation in which the natural-gas liquid 3 is liquefied as much as possible, and then heated by the heating unit 123 to as high a temperature as possible (approximately 80° C.) to maximize the difference from the dew point (liquefaction temperature), as in the conventional practice. Thus, it is possible to prevent wasteful energy consumption while always preventing the generation of a liquid film over the carbon-dioxide separation membranes 131a to 133a of the first to third carbon-dioxide separation units 131 to 133.

Second Embodiment

A second embodiment of the natural-gas purification apparatus according to the present invention will be described with reference to FIG. 3. However, for the same components as those in the above embodiment, description overlapping the description in the above embodiment will be omitted by using the same reference signs as those used in the above embodiment.

Figure 3:
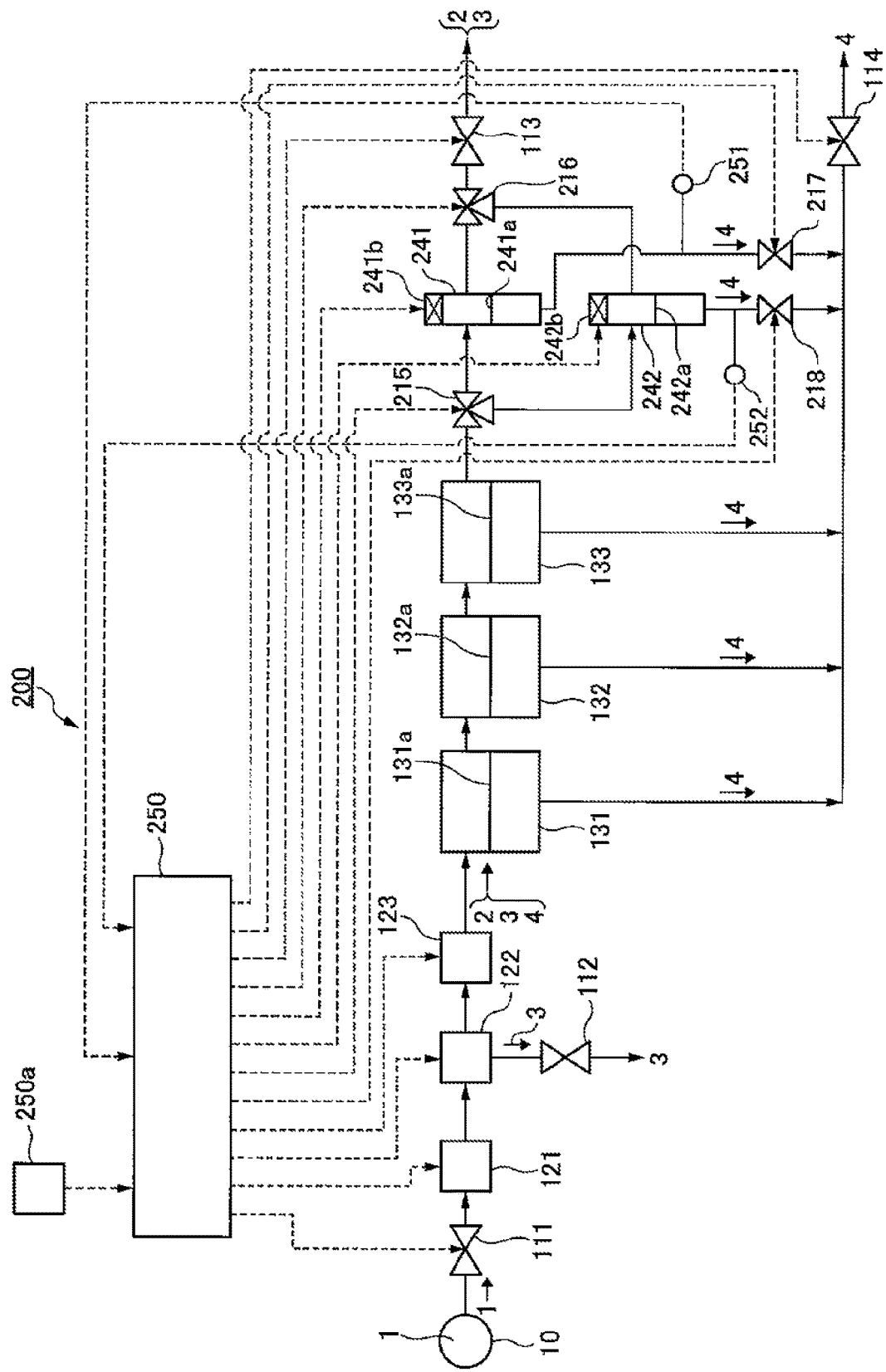
FIG. 3 illustrates a schematic configuration diagram of a second embodiment of the natural-gas purification apparatus according to the present invention.

As illustrated in FIG. 3, the post-separation-gas outlet port of the third carbon-dioxide separation unit 133 is connected to one of ports of a three-way valve 215. One of the remaining ports of the three-way valve 215 is connected to a gas inlet port of a first detection carbon-dioxide separation unit 241 which is a detection carbon-dioxide separator including a carbon-dioxide separation membrane 241a. The other of the remaining ports of the three-way valve 215 is connected to a gas inlet port of a second detection carbon-dioxide separation unit 242 which is a detection carbon-dioxide separator including a carbon-dioxide separation membrane 242a.

A post-separation-gas outlet port of the first detection carbon-dioxide separation unit 241 is connected to one of ports of a three-way valve 216. A post-separation-gas outlet port of the second detection carbon-dioxide separation unit 242 is connected to one of the remaining ports of the three-way valve 216. The other of the remaining ports of the three-way valve 216 is connected to the outside of the system through the valve 113.

A carbon-dioxide outlet port of the first detection carbon-dioxide separation unit 241 is connected to one of ports of a valve 217. The other port of the valve 217 is connected to the outside of the system through the valve 114. A carbon-dioxide outlet port of the second detection carbon-dioxide separation unit 242 is connected to one of ports of a valve 218. The other port of the valve 218 is connected to the outside of the system through the valve 114.

The first and second carbon-dioxide separation units 241 and 242 are provided with heating elements 241b and 242b which are a restoration heater that heats the carbon-dioxide separation membranes 241a and 242a.

Note that the carbon-dioxide separation membranes 241a and 242a of the first and second detection carbon-dioxide separation units 241 and 242 are significantly smaller in surface area than the carbon-dioxide separation membranes 131a to 133a of the first to third carbon-dioxide separation units 131 to 133 (approximately 5% or smaller), as in the carbon-dioxide separation membrane 141a of the detection carbon-dioxide separation unit 141 in the previous embodiment.

Between the carbon-dioxide outlet ports of the first and second detection carbon-dioxide separation units 241 and 242 and the valves 217 and 218, carbon-dioxide-flow-rate sensors 251 and 252 are provided which are a plurality of carbon-dioxide-amount detectors that detect the flow rates of carbon dioxide separated by and discharged from the first and second detection carbon-dioxide separation units 241 and 242, respectively. The carbon-dioxide-flow-rate sensors 251 and 252 are electrically connected to an input of an arithmetic control device 250 which is a controller. An input unit 250a which is an input device that inputs information such as the composition and the supply flow rate of the natural gas 1, is electrically connected to the input of the arithmetic control device 150.

An output of the arithmetic control device 250 is electrically connected to the valves 111, 113, 114, and 215 to 218 and electrically connected to the compressor 121, the cooling unit 122, the heating unit 123, and the heating elements 241b and 242b of the detection carbon-dioxide separation units 241 and 242. The arithmetic control device 250 can control the opening degrees of the valves 111, 113, and 114 and the switching of the opening and closing of the valves 215 to 218 and control the actuation of the compressor 121, the cooling unit 122, the heating unit 123, and the heating elements 241b and 242b based on the above-mentioned information inputted from the input unit 250a and information from the carbon-dioxide-flow-rate sensors 251 and 252 (details will be described later).

Note that in this embodiment, components such as the three-way valves 215 and 216 and the valves 217 and 218 constitute a flow-path switcher.

In sum, in the natural-gas purification apparatus 100 according to the previous embodiment, the single detection carbon-dioxide separation unit 141 is provided and the single carbon-dioxide-flow-rate sensor 151 is provided for this detection carbon-dioxide separation unit 141. In contrast, in a natural-gas purification apparatus 200 according to this embodiment, the two detection carbon-dioxide separation units 241 and 242, including the heating elements 241b and 242b, respectively, are provided and the two carbon-dioxide-flow-rate sensors 251 and 252 are provided for these detection carbon-dioxide separation units 241 and 242. Further, the valves 215 to 218 are provided, which switch the flow path of the purified gas from the third carbon-dioxide separation unit 133 so as to supply the purified gas from the third carbon-dioxide separation unit 133 to one of the detection carbon-dioxide separation units 241 and 242.

Thus, the natural-gas purification apparatus 200 according to this embodiment can, of course, operate similarly to the natural-gas purification apparatus 100 according to the previous embodiment to achieve a similar advantageous effect. In addition, if a flow rate Cd1 (Cd2) detected by the carbon-dioxide-flow-rate sensor 251 (252) for one of the detection carbon-dioxide separation units 241 (242) to which the purified gas is being supplied from the third carbon-dioxide separation unit 133 falls below the prescribed flow rate Cs, the control device 250 further controls the switching of the valves 215 to 218 based on the information from the carbon-dioxide-flow-rate sensor 251 (252) so as to supply the purified gas from the third carbon-dioxide separation unit 133 to the other detection carbon-dioxide separation unit 242 (241). Simultaneously, the control device 250 controls the actuation of the heating element 241b (242b) so as to heat the carbon-dioxide separation membrane 241a (242a) of the one detection carbon-dioxide separation unit 241 (242), with which the flow rate of carbon dioxide has fallen below the prescribed flow rate Cs. In this way, it is possible to quickly restore the performance of the carbon-dioxide separation membrane 241a (242a) of the one detection carbon-dioxide separation unit 241 (242).

Then, when the carbon-dioxide separation membrane 241a (242a) of the one detection carbon-dioxide separation unit 241 (242) is restored and further the flow rate Cd2 (Cd1) detected by the carbon-dioxide-flow-rate sensor 252 (251) for the other detection carbon-dioxide separation unit 242 (241), to which the purified gas is being supplied from the third carbon-dioxide separation unit 133, falls below the prescribed flow rate Cs, the control device 250 further controls the switching of the valves 215 to 218 again so as to supply the purified gas from the third carbon-dioxide separation unit 133 to the one detection carbon-dioxide separation unit 241 (242), whose carbon-dioxide separation membrane 241a (242a) is being heated by the heating element 241b (242b). Further, the control device 250 simultaneously controls the actuation of the heating element 241b (242b) so as to stop the heating of the carbon-dioxide separation membrane 241a (242a) of the one detection carbon-dioxide separation unit 241 (242), and the actuation of the heating element 242b (241b) so as to heat the carbon-dioxide separation membrane 242a (241a) of the other detection carbon-dioxide separation unit 242 (241), with which the flow rate of carbon dioxide has fallen below the prescribed flow rate Cs. In this way, it is possible to continue purifying the natural gas 1 while quickly restoring the performance of the carbon-dioxide separation membrane 241a or 242a of the detection carbon-dioxide separation unit 241 or 242.

Other Embodiments

Meanwhile, in the first embodiment, the arithmetic control device 150 controls the actuation of the heating unit 123 so as to raise the heating temperature of the heating unit 123 if the detected flow rate Cd, which is detected by the carbon-dioxide-flow-rate sensor 151, falls below the prescribed flow rate Cs, which has been determined and inputted in advance (Cd<Cs). The arithmetic control device 150 controls the actuation of the heating unit 123 so as to shift the heating temperature to the initial heating temperature if the detected flow rate Cd reaches or exceeds the prescribed flow rate Cs (Cd≥Cs). The arithmetic control device 150 controls the actuation of the cooling unit 122 so as to lower the cooling temperature of the cooling unit 122 if the heating temperature of the heating unit 123 reaches its limit value without the detected flow rate Cd reaching or exceeding the prescribed flow rate Cs. The arithmetic control device 150 controls the actuation of the cooling unit 122 so as to shift the cooling temperature to the initial cooling temperature if the detected flow rate Cd reaches or exceeds the prescribed flow rate Cs (Cd≥Cs). The arithmetic control device 150 controls the actuation of the compressor 121 and the opening degrees of the valves 113 and 114 so as to lower the pressure to be applied by the compressor 121 and the valves 113 and 114 if the cooling temperature of the cooling unit 122 reaches its limit value without the detected flow rate Cd reaching or exceeding the prescribed flow rate Cs. However, the present invention is not limited to this case. An advantageous effect similar to the first embodiment can be achieved as long as the controller adjusts and controls at least one of the pressure of the natural gas to be achieved by the pressure adjuster, the temperature to which the natural gas is to be cooled by the natural-gas-liquid separator, and the temperature to which the natural gas is to be heated by the heater based on the information from the carbon-dioxide-amount detector such that the amount of carbon dioxide to be separated by the detection carbon-dioxide separator will be higher than or equal to a prescribed amount.

Also, in the second embodiment, the two detection carbon-dioxide separation units 241 and 242 are connected in parallel in a switchable manner. Further, the following operations are performed alternately; if a liquid film is generated in one of the detection carbon-dioxide separation units 241 and 242, the detection carbon-dioxide separation unit is switched to the other detection carbon-dioxide separation unit and the one detection carbon-dioxide separation unit is restored by vaporizing the liquid film, and if a liquid film is generated in the other detection carbon-dioxide separation unit, the detection carbon-dioxide separation unit is switched to the one detection carbon-dioxide separation unit and the other detection carbon-dioxide separation unit is restored by vaporizing the liquid film. However, in another embodiment, three or more detection carbon-dioxide separation units may be connected in parallel in a switchable manner and perform carbon-dioxide separation and liquid-film vaporization in turn.

Also, in the above embodiments, the flow rates of carbon dioxide separated by the detection carbon-dioxide separation units 141, 241, and 242 are detected by providing the carbon-dioxide-flow-rate sensor 151, 251, and 252 on the carbon-dioxide outlet port side (lower pressure side) of the detection carbon-dioxide separation units 141, 241, and 242. However, in another embodiment, for example, flow-rate sensors may be provided between the post-separation-gas outlet ports of the detection carbon-dioxide separation units 141, 241, and 242 and the valve 113 (higher pressure side), and the flow rates of carbon dioxide separated by the detection carbon-dioxide separation units 141, 241, and 242 may be detected based on the detected flow rates detected by these flow-rate sensors. Specifically, the flow rates Cd of carbon dioxide moved through and separated by the carbon-dioxide separation membranes 141a, 241a, and 242a of the detection carbon-dioxide separation units 141, 241, and 242 may be detected from the detected flow rates of the purified gases detected by the above flow-rate sensors.

Also, in the above embodiments, the amount of carbon dioxide is detected based on the flow rate of gas. However, in another embodiment, for example, the amount of carbon dioxide may be detected based on the concentration of carbon dioxide.

Also, in the above embodiments, the carbon dioxide 4 separated by and discharged from the detection carbon-dioxide separation units 141, 241, and 242 is discharged to the outside of the system together with the carbon dioxide 4 separated by and discharged from the first to third carbon-dioxide separation units 131 to 133 by connecting the carbon-dioxide outlet ports of the detection carbon-dioxide separation units 141, 241, and 242 and the carbon-dioxide outlet ports of the first to third carbon-dioxide separation units 131 to 133 together to the outside of the system through the valve 114. However, in another embodiment, for example, the carbon dioxide separated by and discharged from the detection carbon-dioxide separation units 141, 241, and 242 may be returned to the purified gas discharged from the first to third carbon-dioxide separation units 131 to 133, so that the amount of gas does not decrease.

Moreover, although the components such as the three carbon-dioxide separation units 131 to 133 constitute the carbon-dioxide separator in the above embodiments, the present invention is not limited to this case. One carbon-dioxide separation unit may constitute the carbon-dioxide separator or two or more carbon-dioxide separation units may constitute the carbon-dioxide separator.

INDUSTRIAL APPLICABILITY

The natural-gas purification apparatus according to the present invention can prevent wasteful energy consumption while always preventing the generation of a liquid film over the carbon-dioxide separation membranes of the carbon-dioxide separator, and is therefore highly industrially useful.

REFERENCE SIGNS LIST

1 NATURAL GAS
2 DRY GAS
3 NATURAL-GAS LIQUID
4 CARBON DIOXIDE
10 NATURAL-GAS SOURCE
100 NATURAL-GAS PURIFICATION APPARATUS
111 TO 114 VALVE
121 COMPRESSOR
122 COOLING UNIT
123 HEATING UNIT
131 FIRST CARBON-DIOXIDE SEPARATION UNIT
131a CARBON-DIOXIDE SEPARATION MEMBRANE
132 SECOND CARBON-DIOXIDE SEPARATION UNIT
132a CARBON-DIOXIDE SEPARATION MEMBRANE
133 THIRD CARBON-DIOXIDE SEPARATION UNIT
133a CARBON-DIOXIDE SEPARATION MEMBRANE
140A, 140B SAMPLING LINE
141 DETECTION CARBON-DIOXIDE SEPARATION UNIT
141a CARBON-DIOXIDE SEPARATION MEMBRANE
150 ARITHMETIC CONTROL DEVICE
150a INPUT UNIT
151 CARBON-DIOXIDE-FLOW-RATE SENSOR
200 NATURAL-GAS PURIFICATION APPARATUS
215, 216 THREE-WAY VALVE
217, 218 VALVE
241 FIRST DETECTION CARBON-DIOXIDE SEPARATION UNIT
241a CARBON-DIOXIDE SEPARATION MEMBRANE
241b HEATING ELEMENT
242 SECOND DETECTION CARBON-DIOXIDE SEPARATION UNIT
242a CARBON-DIOXIDE SEPARATION MEMBRANE
242b HEATING ELEMENT
250 ARITHMETIC CONTROL DEVICE
250a INPUT UNIT
251, 252 CARBON-DIOXIDE-FLOW-RATE SENSOR

The invention claimed is:

1. A natural-gas purification apparatus for purifying natural gas from ground by separating carbon dioxide from the natural gas, comprising:
   a pressure adjuster that adjusts a pressure of the natural gas from the ground;
   a natural-gas-liquid separator that liquefies and separates a part of natural-gas liquid by cooling the natural gas after the pressure adjustment by the pressure adjuster;
   a heater that heats the natural gas after the separation of the part of the natural-gas liquid by the natural-gas-liquid separator;
   a carbon-dioxide separator that separates carbon dioxide from the natural gas heated by the heater through a carbon-dioxide separation membrane;
   a detection carbon-dioxide separator that further separates carbon dioxide from purified gas obtained as a result of the carbon-dioxide separation by the carbon-dioxide separator through a carbon-dioxide separation membrane;
   a carbon-dioxide-amount detector that detects an amount of carbon dioxide separated by the detection carbon-dioxide separator; and
   a controller that adjusts and controls at least one of:
      a pressure of the natural gas to be achieved by the pressure adjuster,
      a temperature to which the natural gas is to be cooled by the natural-gas-liquid separator, and
      a temperature to which the natural gas is to be heated by the heater based on information from the carbon-dioxide-amount detector such that the amount of carbon dioxide to be separated by the detection carbon-dioxide separator is higher than or equal to a prescribed amount.

2. The natural-gas purification apparatus according to claim 1, wherein the controller controls actuation of the heater so as to raise a heating temperature of the heater if a detected amount Cd detected by the carbon-dioxide-amount detector is lower than a prescribed amount Cs which has been determined and inputted in advance (Cd<Cs).

3. The natural-gas purification apparatus according to claim 2, wherein the controller controls the actuation of the heater so as to shift the heating temperature of the heater to an initial heating temperature if the detected amount Cd reaches or exceeds the prescribed amount Cs (Cd≥Cs).

4. The natural-gas purification apparatus according to claim 2, wherein the controller controls actuation of the natural-gas-liquid separator so as to lower a cooling temperature of the natural-gas-liquid separator if the heating temperature of the heater reaches a limit value without the detected amount Cd reaching or exceeding the prescribed amount Cs.

5. The natural-gas purification apparatus according to claim 4, wherein the controller controls the actuation of the natural-gas-liquid separator so as to shift the cooling temperature of the natural-gas-liquid separator to an initial cooling temperature if the detected amount Cd reaches or exceeds the prescribed amount Cs (Cd≥Cs).

6. The natural-gas purification apparatus according to claim 4, wherein the controller controls actuation of the pressure adjuster so as to lower a pressure to be applied by the pressure adjuster if the cooling temperature of the natural-gas-liquid separator reaches a limit value without the detected amount Cd reaching or exceeding the prescribed amount Cs.

7. The natural-gas purification apparatus according to claim 6, wherein the controller controls the actuation of the pressure adjuster so as to shift the pressure to be applied by the pressure adjuster to an initial pressure if the detected amount Cd reaches or exceeds the prescribed amount Cs (Cd≥Cs).

8. The natural-gas purification apparatus according to claim 1, wherein
the natural-gas purification apparatus comprises a plurality of the detection carbon-dioxide separators and a plurality of the carbon-dioxide-amount detectors,
the natural-gas purification apparatus further comprises a flow-path switcher that switches a flow path of purified gas from the carbon-dioxide separator such that the purified gas from the carbon-dioxide separator is supplied to one of the plurality of detection carbon-dioxide separators, and
if the amount of carbon dioxide separated by one of the detection carbon-dioxide separators to which the purified gas from the carbon-dioxide separator is being supplied falls below a prescribed amount, the controller controls switching of the flow-path switcher based on information from the corresponding one of the carbon-dioxide-amount detectors so as to supply the purified gas from the carbon-dioxide separator to another one of the detection carbon-dioxide separators.

9. The natural-gas purification apparatus according to claim 8, further comprising a restoration heater capable of heating each of the carbon-dioxide separation membranes of the plurality of detection carbon-dioxide separators,
wherein when controlling the switching of the flow-path switcher so as to supply the purified gas from the carbon-dioxide separator to the other one of the detection carbon-dioxide separators, the controller simultaneously controls actuation of the restoration heater so as to heat the carbon-dioxide separation membrane of the one of the detection carbon-dioxide separators with which the amount of carbon dioxide separated has fallen below the prescribed amount.

10. The natural-gas purification apparatus according to claim 9, wherein
when controlling the switching of the flow-path switcher so as to supply the purified gas from the carbon-dioxide separator to the one of the detection carbon-dioxide separators whose carbon-dioxide separation membrane is being heated by the restoration heater, the controller simultaneously controls the actuation of the restoration heater so as to stop the heating of the carbon-dioxide separation membrane of the one of the detection carbon-dioxide separators.

* * * * *